United States Patent [19]

Thomas

[11] 4,341,399
[45] Jul. 27, 1982

[54] PASSIVE SEAT BELT SYSTEM

[75] Inventor: Rudy V. Thomas, Sterling Heights, Mich.

[73] Assignee: Allied Corporation, Morris Township, Morris County, N.J.

[21] Appl. No.: 112,668

[22] Filed: Jan. 16, 1980

[51] Int. Cl.³ .......................................... B60R 21/10
[52] U.S. Cl. ................................... 280/802; 280/804
[58] Field of Search ...................... 280/802, 803, 804; 242/104.7 A

[56] References Cited

U.S. PATENT DOCUMENTS

| | | | |
|---|---|---|---|
| 3,684,310 | 8/1972 | Weststrate | 280/803 |
| 3,827,714 | 8/1974 | Lefeuvre | 280/804 |
| 3,833,239 | 9/1974 | Coenen | 280/804 |
| 3,865,397 | 2/1974 | Pilhall | 280/803 |
| 3,899,191 | 8/1975 | Royce | 280/802 |
| 4,084,841 | 4/1978 | Hayashi | 280/802 |

Primary Examiner—Robert R. Song
Attorney, Agent, or Firm—Roger H. Criss

[57] ABSTRACT

A passive seat belt system including a retractor spool housing the seat belt and which is rotatable on a shaft in response to door opening to move the seat belt to a non-restraining position permitting easy ingress to the vehicle. The spool mechanism is separate from a lower retractor frame which is fixed to the vehicle. The spool is movable into load transfer engagement with the lower frame upon application of a load to the spool.

22 Claims, 4 Drawing Figures

PASSIVE SEAT BELT SYSTEM

DESCRIPTION

BACKGROUND OF THE INVENTION

1. Field of the Invention

This invention relates to a passive seat belt system.

2. Description of the Prior Art

Various passive seat belt systems have heretofore been suggested. One type of passive seat belt system is a so-called three point system which includes a fixed length of webbing attached to upper and lower portions of the vehicle door and a junction ring slidably mounted on the webbing and attached to a length of webbing which is stowed on a seat belt retractor mounted inboard of the seat, such as under a center arm rest. A disadvantage of such system is that ingress by the occupant is inconvenient because the webbing lies close to the seat cushion and the occupant must lift the webbing and slide under the webbing to insure that the webbing is automatically placed in its proper position upon actuation of a predetermined event, such as closing of the vehicle door.

Various devices have been proposed to move the inboard belt position upwards and forwards, commensurate with door opening, to alleviate the above problems. An example of one such system is that disclosed in my U.S. Application Ser. No. 62,277 filed July 30, 1979, in which an auxiliary power device is utilized to move the webbing forwards. However, such devices tend to be expensive and complicated as they require an auxiliary power device to operate the articulation device. Other proposed devices require an intentional act by the occupant to move the belt to a noninterferring position. It would be desirable if a passive seat belt system were provided that alleviated the above problems.

SUMMARY OF THE INVENTION

In accordance with this invention, there is provided a vehicle passive seat belt system comprising a seat belt adapted to be automatically placed in a restraining position about an occupant seated in a seat in the vehicle adjacent to a vehicle door, the seat belt extending at least across the upper torso of the occupant; the seat belt being anchored to the vehicle at a first mounting point located at a position adjacent the seat inboard of the door and at a second mounting point located adjacent the outboard side of the seat; and means to automatically move one of the first and second mounting points from a first position at which the belt is in a restraining position about the occupant when seated in the seat to a second position at which the belt is in a non-restraining position about the occupant when seated in the seat, the means being non-motorized and being actuated in response to a force applied to the belt.

In addition, this invention provides a vehicle passive seat belt system comprising a seat belt adapted to be automatically placed in a restraining position about the occupant seated in a seat in the vehicle, the seat being adjacent to a door in the vehicle, the seat belt extending across at least the upper torso of the occupant; the seat belt being anchored to the vehicle at a first mounting point located at a position adjacent the seat inboard of the door; and means to automatically move the first mounting from a first restraining position to a second non-restraining position. In further accordance with this invention, there is provided a seat belt system in which a seat belt retractor is normally in a non-load transfer position and is placed into a load-transfer position upon an emergency condition in the vehicle.

BRIEF DESCRIPTION OF THE PREFERRED EMBODIMENTS

Figure 1:
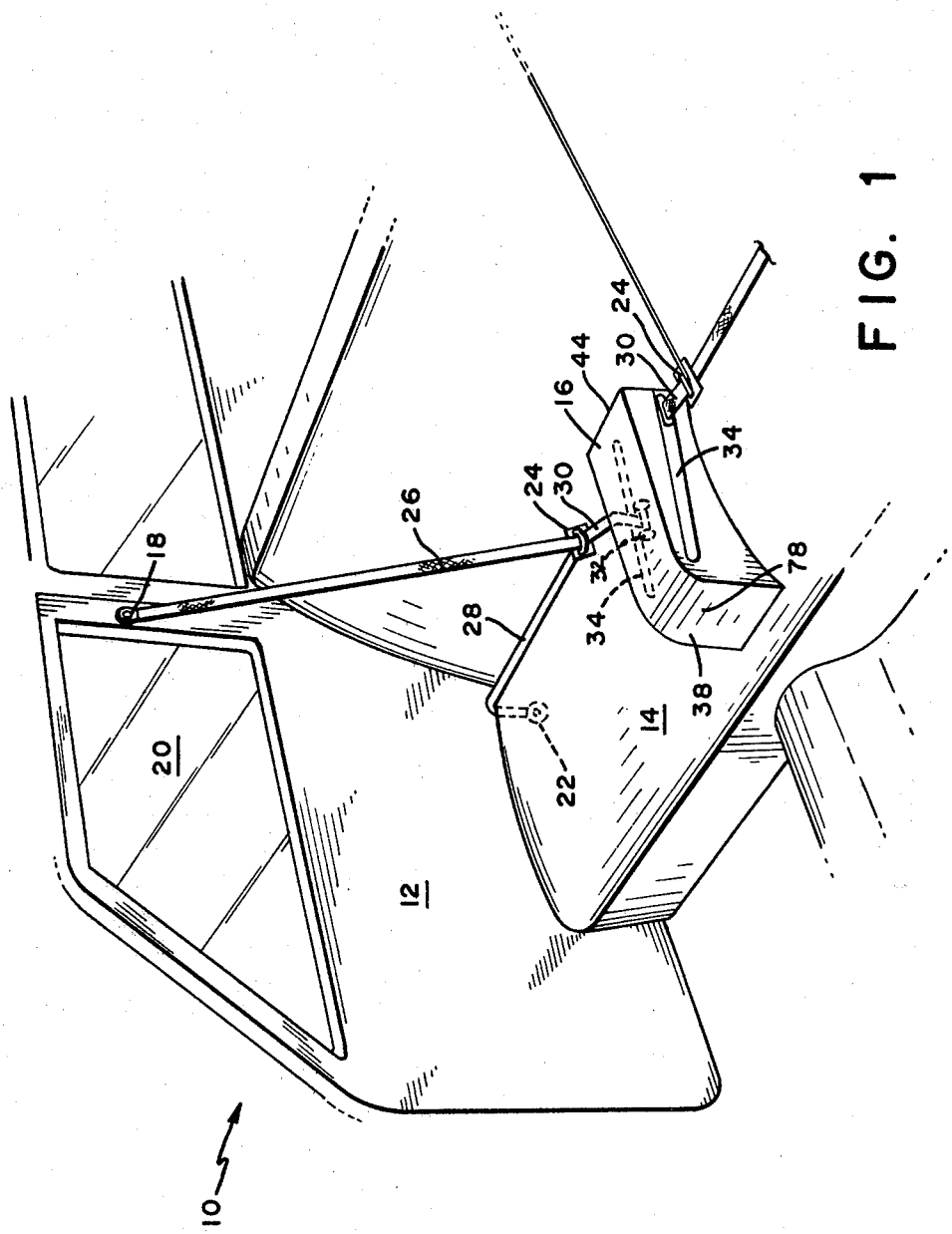
FIG. 1 is a perspective view of one embodiment of the passive seat belt system of this invention.

With reference to FIG. 1, there is shown an embodiment of the passive seat belt system of this invention, generally indicated at 10, in a vehicle having a door 12 and a seat 14 adjacent thereto. Although seat 14 as shown is a bench seat, it is to be understood that the invention is applicable to a bucket-type seat as well. Inboard of door 12 on seat 14 is an arm rest or console 16. A three-point seat belt is provided for seat 14. This includes a fixed length of webbing which is attached to door 12 at an upper position via an anchor plate 18 on the frame of door 12 adjacent window 20 and at a lower position via anchor plate 22 affixed on the lower portion of door 12. Such webbing extends intermediate anchor plates 18 and 22 through a junction ring 24. As can be seen, the webbing is in the form of a shoulder belt 26 which is adapted to extend across the upper torso of the occupant from anchor plate 18 to junction ring 24 and a lap belt portion which is adapted to extend across the pelvic region of the occupant from junction ring 24 to anchor plate 22. Lap and shoulder belt portions 26 and 28 are adapted to freely slide through junction ring 24. Fixedly attached to junction ring 24 is one end of a connecting belt 30, the other end of which is mounted upon a seat belt retractor 32 mounted to the vehicle beneath arm rest 16. The system as described above is similar to that disclosed in U.S. Patent Application Ser. No. 57,605 filed July 16, 1979, and junction ring 24 may be provided with a lock feature as disclosed in said application. In addition, if desired either anchor plate 18 or 22 may be provided with a releasable interconnection in the form of a buckle and tongue assembly or the like, or an emergency release mechanism may be provided in retractor 32 to provide a means for disconnecting the passive seat belt system in the event of an emergency.

In accordance with this invention, the spool assembly of retractor 32 is mounted for forwards and upwards displacement within arm rest 16 as viewed in FIG. 1. Slots 34 are provided on both sides of arm rest 16 to accommodate movement of the connecting belt 30 for each seating position as the respective spool assembly associated with the respective retractor is moved.

A spirally grooved shaft 36 is non-rotatably anchored interiorly of arm rest 16. One end of shaft 36 is fixed in plate 40 located at the forward end 38 of arm rest 16 and the other end of shaft 36 is fixedly mounted to a lower frame 42 of retractor 32 located at the rearward end 44 of arm rest 16. The pitch of spiral groove 46 of shaft 36 is chosen so as to be smaller at both ends than in the center section 48. Over the rearward end of shaft 36 is a slip fitting bushing 50 which is keyed at 52 to the rotation of spool assembly 54 of retractor 32 upon which webbing 30 is wound. The inner end of a conventional rewind spring 56 is attached to bushing 50 and the outer end of spring 56 is fixed to cover 58 which contains spring 56 and which is mounted to upper frame 60 of retractor 32. A spiral groove follower 62, in the form of a ball 64 and plug 66, is contained in bushing 50 so that rotation of bushing 50 causes the spool assembly 54 and upper frame 60 to linearly traverse shaft 36 in accordance with the pitch of spiral groove 46.

Spool assembly 54 includes a central tube or spool 68 and end gears 70. One end of webbing 30 is attached to spool 68. Gears 70 are in the form of ratchet wheels which have ratchet teeth along their periphery, as is conventional. Spool assembly 54 is fixed for rotation with bushing 50 through which shaft 36 extends. Upper housing 60 is in the form of a U-shaped frame including side flanges 72 through which both bushing 50 and shaft 36 extend. Bushing 50 is rotatably mounted within flanges 72. Extending across side flanges 72 are two spring members 74 upon which are rotatably mounted upper and lower rollers 76. Rollers 76 are adapted to contact the interior side surface 78 of arm rest 16 in order to prevent upper frame from rotating as the frame traverses groove 46 due to the torque transmitted from rotation of spool assembly 54.

Lower frame 42 of retractor 32 includes side flanges 80 and a base portion 82. Mounted within side flanges 80 is a plastic saddle 84 from which a weighted pendulum 86 is suspended. Pendulum 86 includes a cap 88 which is in contact with a portion 90 of locking dog (pawl) 92 which is also supported in saddle 84. A deceleration force acting on the vehicle causes pendulum 86 to pivot and lift up pawl 92 which engages with the ratchet teeth on gears 70 to lock the retractor against rotation in the extraction direction and thus prevent additional extraction of webbing from spool 68. Lower frame 42 is mounted via bolt 94 to a mounting surface in the vehicle, such as the seat or the floor. Back surface 73 of upper frame 60 is provided with a U-shaped tang 96 which is adapted to engage lower frame 42 through an opening 98 in lower frame 42 to provide load transfer contact between the upper and lower frames, as described below.

In operation of the above-described embodiment, when door 12 is in a closed position with shoulder belt 26 and lap belt 28 in their restraining positions, upper frame 60 of retractor 32 is located at its most rearward position so that tang 96 is adjacent to opening 98 and the upper and lower frames of retractor 32 are positioned for load transfer engagement in the event of a deceleration of the vehicle above a predetermined level. When door 12 is opened, webbing 30 is extracted from the rewind mechanism off of spool 68. Rotation of spool 68 and gears 70 fixed thereto causes rotation of bushing 50 together with upper frame 60 on spiral groove 46 of shaft 36. Since the pitch of groove 46 is relatively small at the rearward end of shaft 36, initial extraction of webbing 30 results only in a slight linear motion of bushing 50 and upper frame 60 on shaft 36, so that tang 96 still remains close to and engageable with opening 98. The amount of webbing which may be extracted without significant linear motion of the rewind mechanism on shaft 36 is selected so as to insure that there remains a load transfer positioning of the upper and lower frames regardless of the size the occupant or the position of seat 14. For example, the pitch of groove 46 may be selected so that about 25 cm of webbing may be extracted from spool 68 without separation of the upper and lower retractor frames from their load transfer positions.

Figure 2:
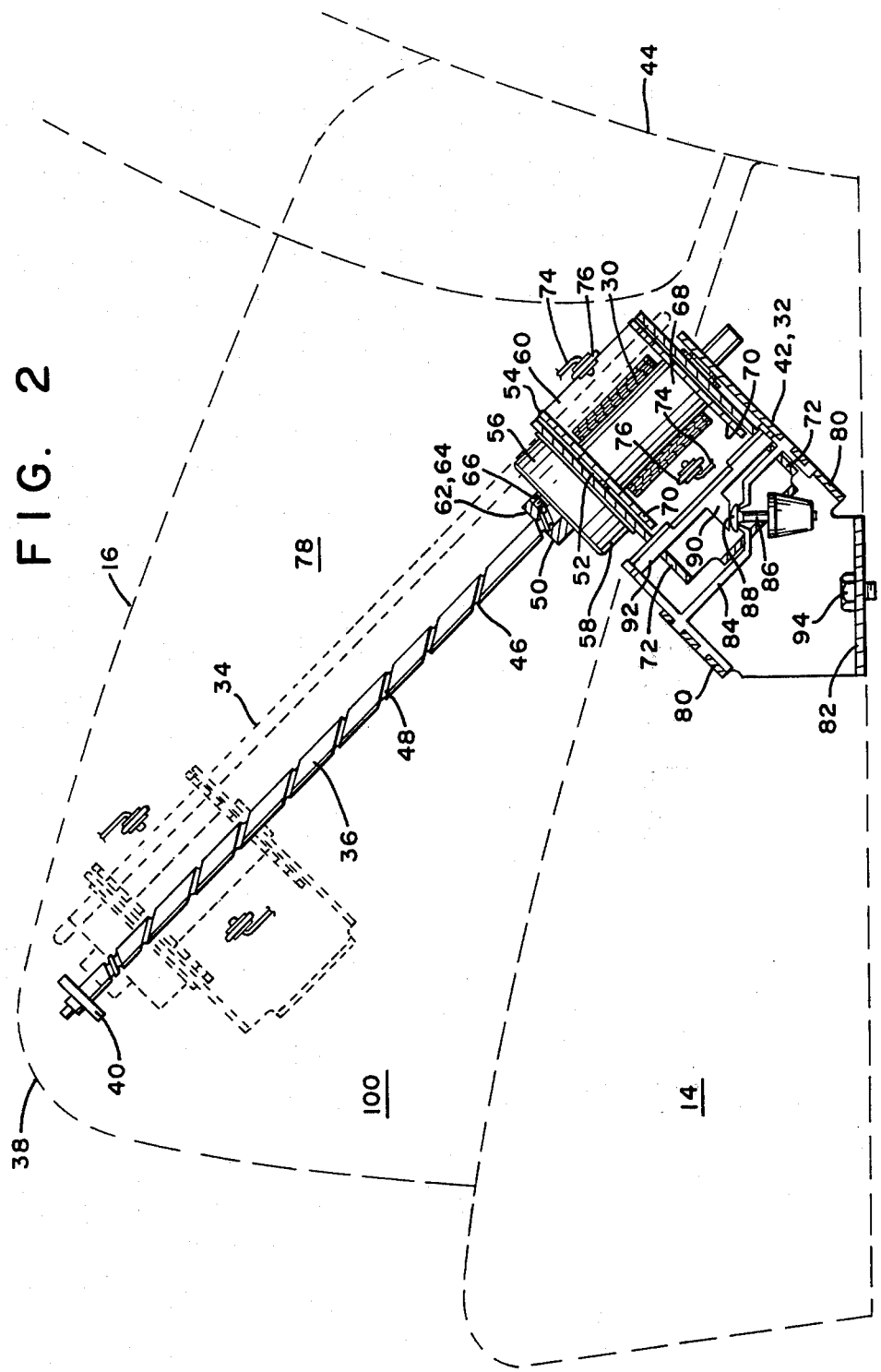
FIG. 2 is a side view of the seat belt retractor mechanism of the system of FIG. 1 as shown in its restraining and non-restraining positions.
Figure 3:
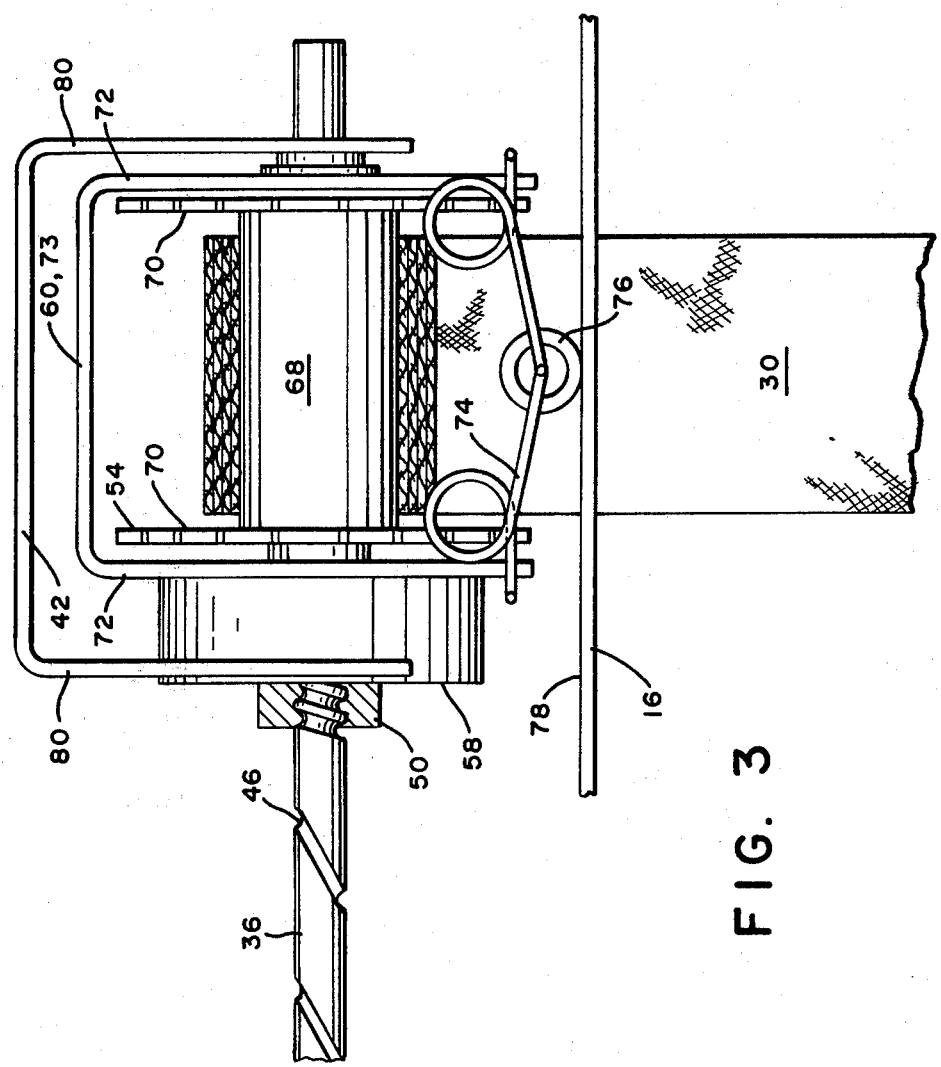
FIG. 3 is a top view of the retractor mechanism of FIG. 2.

As further webbing is extracted from spool 68 due to further opening of door 12, bushing 50 and upper frame 60 linearly traverse shaft 36 to the left in FIG. 2 (in a diagonally upwards direction in FIG. 1) to their forwardmost position 100 adjacent to plate 40. The pitch of groove 46 is selected such that some excess webbing may be extracted from spool 68 without bottoming the assembly in that position. Contact of rollers 76 against inner surface 78 of arm rest 16 prevents the torque resulting from rotation of spool 68 from rotating upper frame 60.

When the inboard anchoring point for the belt has moved forwards and upwards, additional room is provided for occupant ingress, without having to lift the belts off of the seat. When door 12 is closed, excess webbing is taken up by spool 68 rotating in the opposite direction due to the bias of its rewind spring 56. Rotation of spool 68 in the rewind direction causes rotation of bushing 50 along shaft 36 linearly to the right in FIG. 2 (in a diagonally rearward and downward direction in FIG. 1) to its original position. As indicated above, when a predetermined amount of webbing remains to be rewound onto retractor 32, upper frame 60 has returned to its position in which it is positioned for engagement with lower frame 42.

Figure 4:
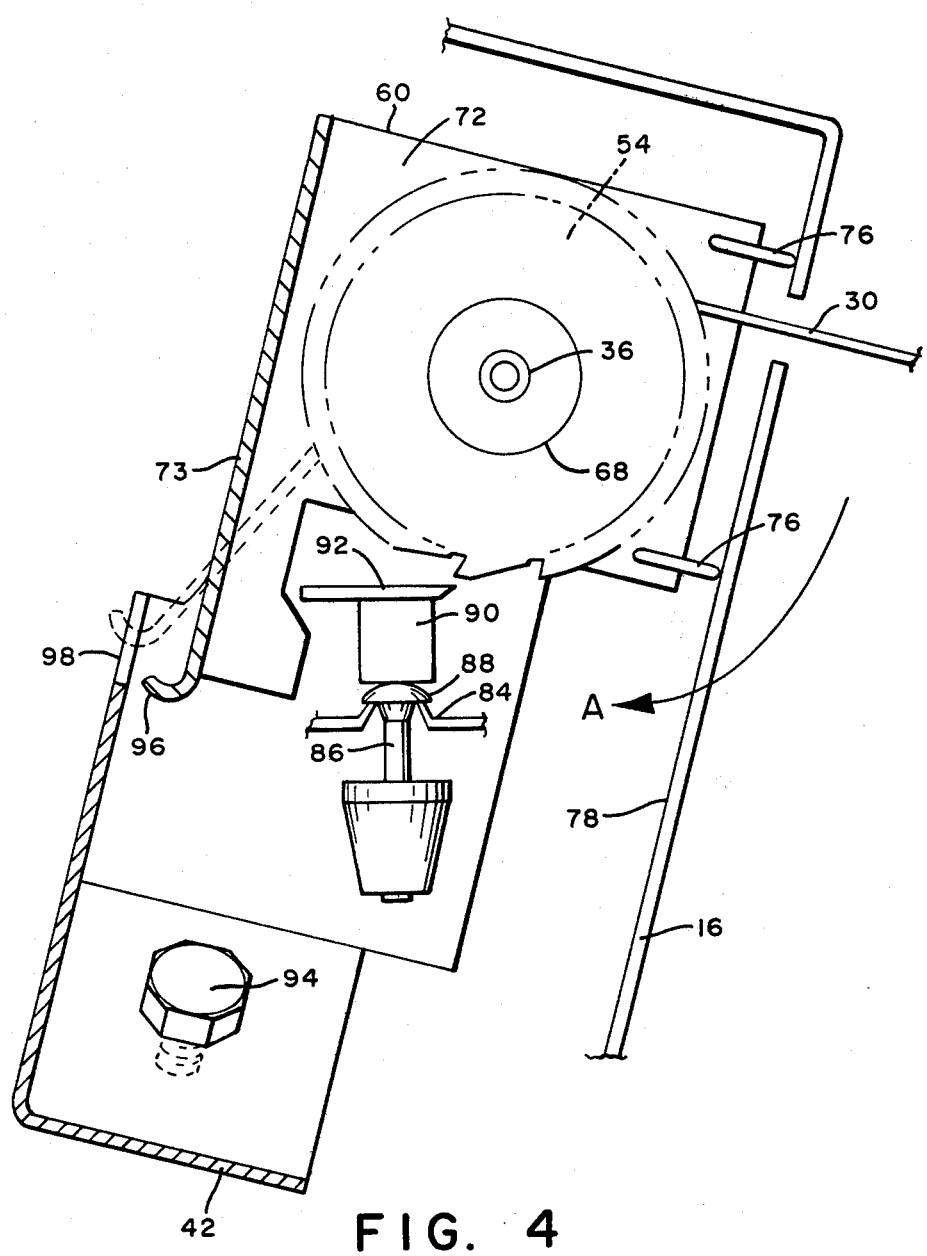
FIG. 4 is a cross-sectional view of the retractor mechanism of FIG. 2.

In the event that a deceleration of the vehicle is above the predetermined level and thus causes lock up of the pawl and ratchet teeth, forces tending to rotate spool 68 in the extraction direction (clockwise in FIG. 4) transfer such rotary force to upper frame 60 through pawl 92. This results in a slight rotary motion of upper frame 60 in the direction of arrow A (clockwise) against the bias of springs 74 so that tang 96 extends through opening 98 in lower frame 42. In this manner, the load is transferred to the lower frame of the retractor and thence to the vehicle structure. Rotation of upper frame 60 causes compression of upper spring 74 due to contact of its associated roller 76 with interior side 78 of arm rest 18. Should the collision forces be mild, spring 74 will return upper frame 60 to its original position.

Although in the above embodiment the automatically movable anchor point has been described as being the inboard anchor point, this invention also contemplates movement of the outboard anchor point should the retractor be mounted on the outboard side of seat 14, such as on door 12 or on the roof or floor of the vehicle. Furthermore, this invention is also applicable to a two-point belt system in which a single diagonal belt is adapted to extend across the upper torso of the occupant and a knee bolster is mounted on the dashboard to provide lower body restraint.

It is also to be noted that upper frame 60 and belts 26 and 28 may be moved forwardly of their restraint positions by the occupant manually extending belt 30 in a forwards direction to extract additional webbing from retractor 32.

The present invention provides a relatively inexpensive and uncomplicated passive seat belt system with improved ingress capability which does not require an intentional act by the occupant or the use of motorized devices.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A vehicle passive seat belt system comprising:
   a seat belt adapted to be automatically placed in a restraining position about an occupant seated in a seat in said vehicle adjacent to a vehicle door, said seat belt extending at least across the upper torso of said occupant;
   said seat belt being anchored to said vehicle by at least one first mounting point located at a position adjacent said seat inboard of said door and by at least one second mounting point located adjacent to the outboard side of said seat;
   at least one of said first and second mounting points comprising winder means, said winder means comprising a rotatable storage means which is in communication with said seat belt, said storage means being rotatable in response to movement of said seat belt; and
   means to automatically move said at least one of said first and second mounting points from a first position at which said seat belt is in a restraining position about said occupant when seated in said seat to a second position at which said seat belt is in a non-restraining position about said occupant, said means being non-motorized and being actuated in response to a force applied on said seat belt resulting in rotation of said storage means.

2. The passive seat belt system of claim 1 wherein said first mounting point comprises a seat belt retractor upon which seat belt webbing is wound, said webbing being in communication with said seat belt.

3. The passive seat belt system of claim 2 wherein said retractor is adapted for movement forwards and rearwards with respect to said seat.

4. The passive seat belt system of claim 3 wherein said retractor is adapted for movement in a forwards and upwards direction with respect to said seat and in a rearwards and downwards direction with respect to said seat.

5. The passive seat belt system of claim 1 wherein said seat belt is adapted to extend across the upper torso and the pelvic region of said occupant.

6. The passive seat belt system of claim 5 wherein said seat belt is fixed to said door at upper and lower mounting points.

7. The passive seat belt system of claim 6 including a junction ring slidably mounted on said seat belt, said junction ring being connected to said seat belt webbing.

8. The passive seat belt system of claim 1 wherein said winder means comprises a seat belt retractor and said rotatable storage means comprises a spool assembly, said spool assembly being rotatably mounted on a spirally grooved shaft fixedly mounted in said vehicle.

9. The passive seat belt system of claim 1 wherein said first mounting point comprises said winder means.

10. A vehicle seat belt system comprising:
    retractor means adapted to be mounted in said vehicle;
    seat belt webbing stored on said retractor means and adapted to be extended therefrom and retracted thereon; and
    locking means operable to lock said retractor means to prevent extension of said webbing from said retractor means;
    said retractor means comprising a first part adapted to be mounted in a load transfer relationship with a structural part of said vehicle and a second part normally separated from load transfer engagement with said first part but movable into load transfer engagement with said first part in response to a load of a predetermined amount being applied to said second part, whereby said load is transferred to said structural part of said vehicle.

11. The seat belt system of claim 10 wherein said second part of said retractor means comprises a spool, said webbing being wound up on said spool.

12. The seat belt system of claim 11 wherein said second part of said retractor means is movable to a position at which a load applied to said second part is not transferable to said first part.

13. The seat belt system of claim 12 wherein said spool is rotatably mounted on a spirally grooved shaft, rotation of said spool on said shaft resulting in movement of said second part of said retractor means away from said first part.

14. The seat belt system of claim 13 wherein the pitch of said spirally grooved shaft is such that said spool may rotate a predetermined initial amount from said normally separated position whereby said second part is still movable into load transfer engagement with said first part, and rotation of said spool beyond said predetermined initial amount results in separation of said second part from said first part so that said load transfer engagement is not possible.

15. The seat belt system of claim 10 wherein said first part of said retractor means comprises a fixed frame member.

16. The seat belt system of claim 15 wherein said second part of said retractor means comprises a spool frame upon which said spool is mounted, said spool frame comprising an extension and said fixed frame member comprising an aperture adapted to receive said extension, said extension normally being separated from said aperture but being movable into said aperture in response to movement of said spool frame resulting from said load of said predetermined amount, whereby said load is transferred to said structural part of said vehicle.

17. A vehicle passive seat belt system comprising:
    a seat belt adapted to be automatically placed in a restraining position about an occupant seated in a seat in said vehicle, said seat being adjacent to a door in said vehicle, said seat belt extending at least across the upper torso of said occupant;
    said seat belt being anchored to said vehicle at a first mounting point located at a position adjacent said seat inboard of said door, said first mounting point comprising a seat belt retractor upon which seat belt webbing is wound, said webbing being in communication with said seat belt, said retractor comprising a spool assembly movable with respect to said seat;
    an arm rest on said seat and a spirally grooved shaft located within said arm rest, said retractor and spool assembly being mounted for rotation on said shaft; and
    means to automatically move said first mounting point from a first restraining position to a second non-restraining position.

18. The passive seat belt system of claim 17 wherein the pitch of the spiral grooves of the spirally grooved shaft is smaller at the ends than at its center.

19. The passive seat belt system of claim 18 including an arm rest on said seat, said shaft being located within said arm rest.

20. A vehicle passive seat belt system comprising:
a seat belt adapted to be automatically placed in a restraining position about an occupant seated in a seat in said vehicle adjacent to a door in said vehicle, said seat belt extending at least across the upper torso of said occupant;
a spirally grooved shaft fixedly mounted in said vehicle at a position inboard of said seat; and
winder means comprising rotatable storage means in communication with said seat belt, said rotatable storage means being rotatably mounted on said shaft,
said seat belt being automatically moved from a first restraining position to a second non-restraining position in response to rotation of said rotatable storage means on said shaft resulting from movement of said seat belt.

21. The passive seat belt system of claim 20 wherein said winder means comprises a seat belt retractor and said rotatable storage means comprises a spool assembly.

22. The passive seat belt system of claim 21 wherein the pitch of the spiral grooves of said spirally grooved shaft is smaller at at least one end than at its center.

* * * * *